June 14, 1938.  E. W. TAYLOR  2,120,300
RECIPROCATING MACHINE TOOL
Filed Sept. 15, 1936   2 Sheets-Sheet 1
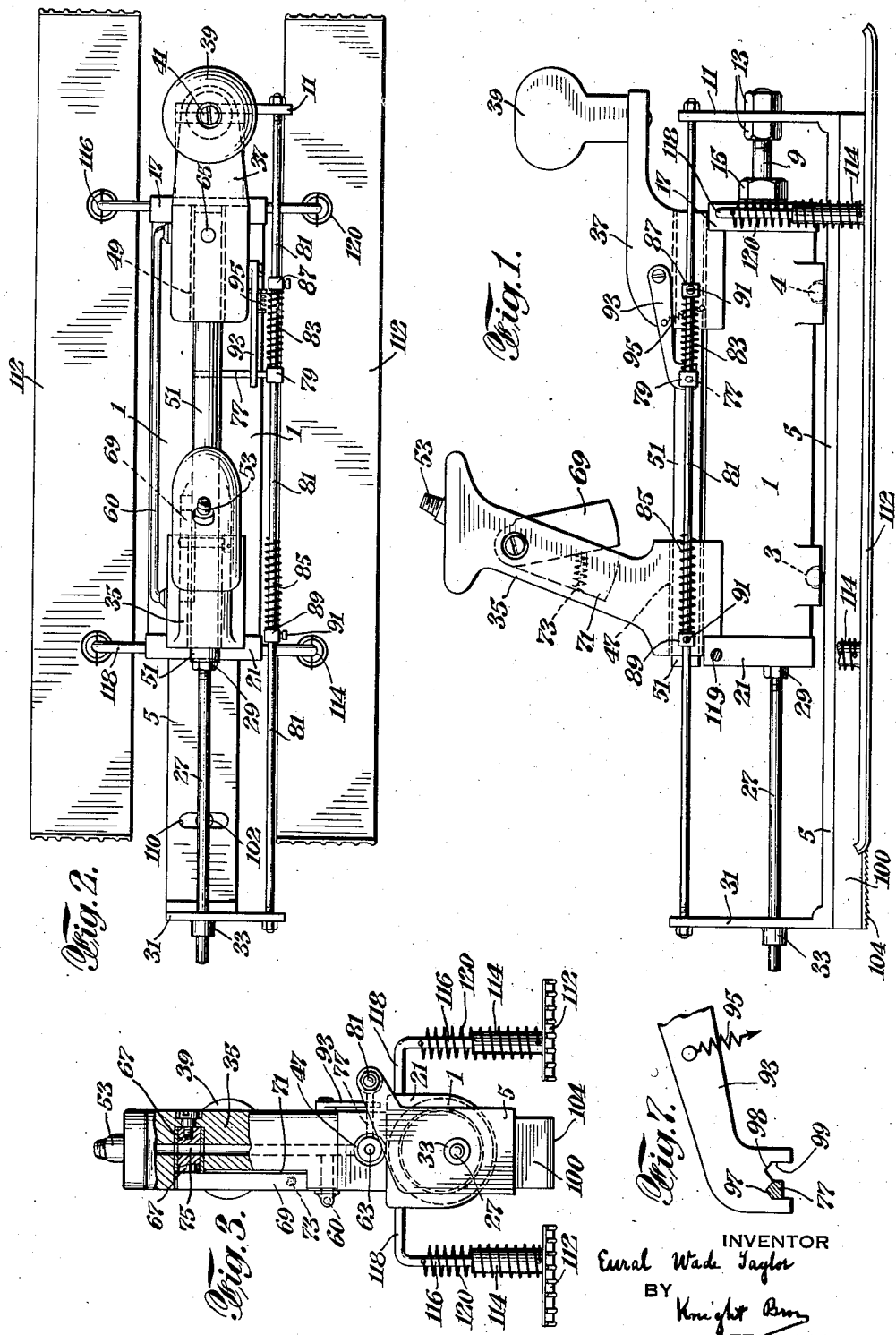
INVENTOR
Eural Wade Taylor
BY
Knight Bro
ATTORNEYS

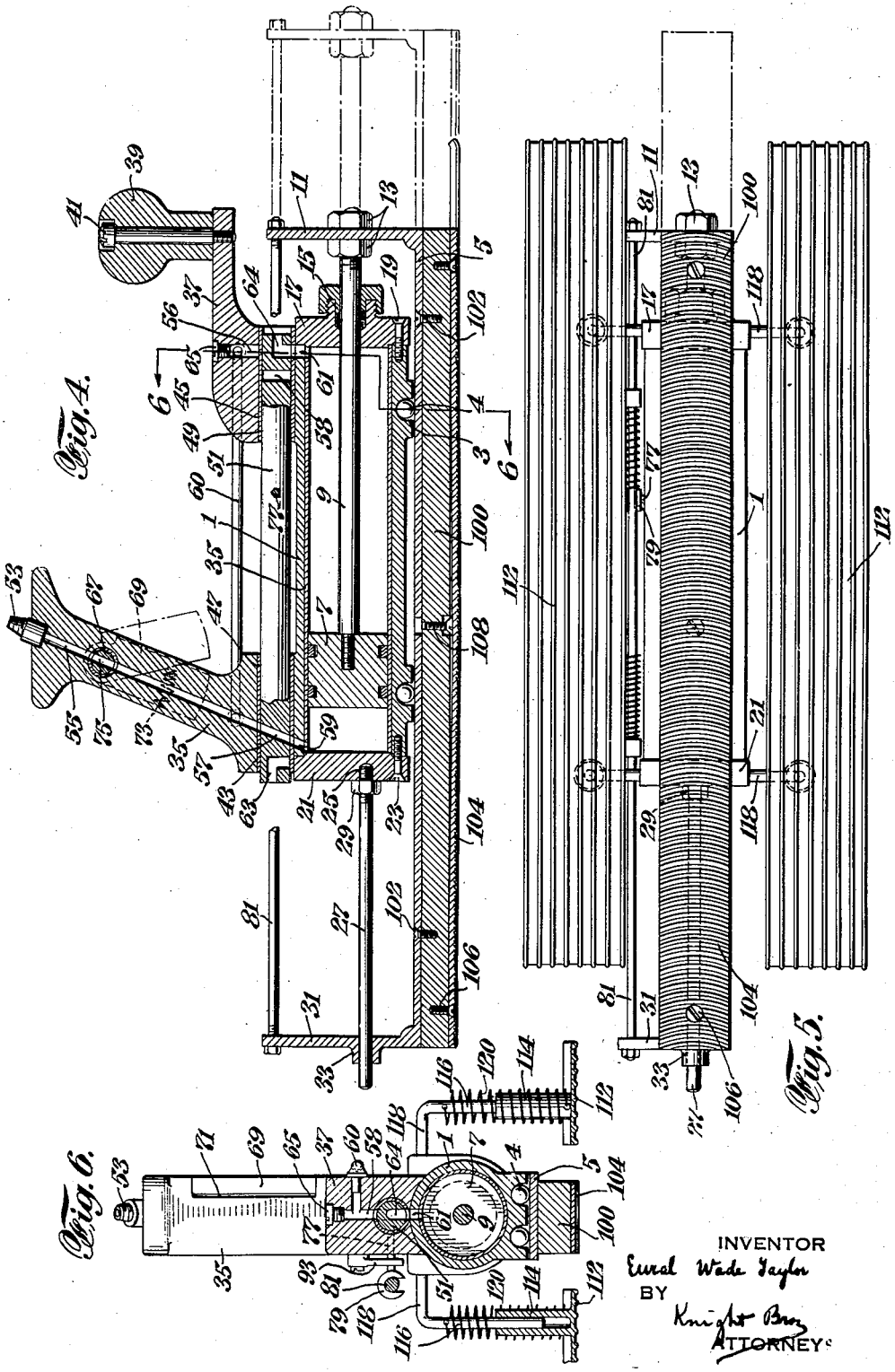

Patented June 14, 1938

2,120,300

UNITED STATES PATENT OFFICE 2,120,300

RECIPROCATING MACHINE TOOL

Eural Wade Taylor, Arp, Tex.

Application September 15, 1936, Serial No. 100,814

11 Claims. (Cl. 121—3)

This invention relates to a power driven reciprocating machine tool.

One object of the invention is to provide a power driven reciprocating tool which can be brought to bear upon the work against the pressure of a yielding stabilizer, which is mounted upon the motor beside the tool; this stabilizer being adapted to take up a considerable part of the vibration of the tool and to guide the tool into contact with the work.

Another object is to provide a tool of this kind which is well balanced and in which the pressure of the operator's hands is applied directly over the middle of the tool.

Another object is to provide a reciprocating tool driven by a pressure fluid under the control of a valve mechanism operated by the movement of the tool itself with respect to the motor and having a snap action between its limit positions to reverse the flow of the pressure fluid into the cylinder.

Another object is to provide a reciprocating machine tool which is guided to the work by stabilizers located on each side of the tool and providing a yielding resistance to the pressure which brings the tool into engagement with the work.

Another object is to provide a tool of the kind described of highly simplified design.

The invention will be described with reference to an embodiment shown in the drawings, which illustrate the applicant of the invention to a power driven file.

In the drawings—

Figure 1 is a side elevation of a power driven reciprocating file embodying my invention;

Figure 2 is a plan view thereof;

Figure 3 is an end elevation partly in section;

Figure 4 is a central longitudinal section;

Figure 5 is a bottom plan view;

Figure 6 is a cross-section on the line 6—6 of Figure 4; and

Figure 7 is a detail view partly in section of a part of the valve control mechanism.

A cylinder 1 is provided on its bottom surface with sockets 3 to receive balls 4 acting as bearings for a tool carriage 5. Within the cylinder is a piston 7 joined by a connecting rod 9 to an upright end plate 11 on the tool carriage 5. The connecting rod is fastened to the end plate 11 by nuts 13 and is guided through a stuffing box 15 on the cylinder head 17. The cylinder head is fixed to the cylinder by screws, one of which is shown at 19. At the opposite end of the cylinder is a head 21 fastened to the cylinder by screws 23. This head has a threaded socket 25 into which is screwed a guide rod 27. The guide rod is locked to the cylinder head 21 by a nut 29. An upright end plate 31 on the tool carriage 5 is provided with a perforated boss 33 which serves to guide the end plate 31 on the rod 27. The cylinder 1 is preferably provided with a removable liner 35, which can be driven out by removing the cylinder heads. From the structure described it will be seen that the tool carriage is guided for reciprocation between the positions shown in full lines and in dotted lines in Figure 4, by means of bearings on the lateral surface of the cylinder and by means of the connecting rod and guide rod engaging the upright end plates of the tool carriage.

The cylinder 1 is preferably cast with integral handles 35 and 37, the latter having a knob 39 fixed to its end by means of a screw 41. At the base of these handles, which are located at the opposite ends to the cylinder, are drilled two holes 43 and 45, which are lined with removable liners 47 and 49 serving to guide a sliding valve 51. This valve controls the intake and exhaust of the fluid pressure medium to and from the cylinder, alternately on opposite sides of the piston 7. The fluid pressure medium, for instance compressed air, is supplied through a nipple 53 leading to a duct 55 bored through the handle 35. In the position of the valve shown in full lines in Figure 4 the duct 55 is connected by a port 57 running through the valve with a port 59 leading into the left end of the cylinder. When the valve is in this position a port 61 in the opposite end of the cylinder is in registry with an exhaust port 64 in the valve. Thus, when air is admitted through the duct 55 with the parts in the position shown in the drawings, the piston is free to move under the pressure of the air toward the right. Near the end of its movement toward the right the valve 51 is shifted by a mechanism to be described presently, so that the intake port 58 comes into position to connect the port 61 of the cylinder with a duct 56 connected by a pipe 60 with the duct 55. At the same time exhaust port 63 is brought into registry with port 59, thus connecting the left end of the cylinder with the atmosphere and allowing piston 7 to move on its leftward stroke under the force of air admitted through port 61. The duct 56 is capped by a screw 65. The duct 55 is controlled by a valve 67 operated by a trigger 69, which is adapted to move into a recess 71 in handle 35 when squeezed by the fingers of the operator, but which is normally held out by a spring 73. When the trigger 69 is squeezed into the recess the duct 75 of valve 67 is brought into alinement with duct 55. Any speed of supply of the compressed fluid to the motor can be secured by suitable positioning of the trigger 69.

The mechanism for controlling the movement of the valve will now be described. Rigidly projecting from the valve is a pilot 77, the outer end of which bears a guide 79 having a downwardly opening recess fitting over a guide rod 81 extending between the end plates 11 and 31 of the tool carriage. On the opposite sides of the guide 79 are mounted on guide rod 81 coil springs 83 and 85. These are limited in their movement along the guide rod 81 by collars 87, 89 fixed to the guide rod 81 in any desired position by set screws 91. There is also pivotally mounted upon handle 37 a block and cam device 93, which is normally urged downward by a spring 95 so that its end presses against pilot 77. The pilot has the cross section shown in the detail view Figure 7 and the peaked upper edge of the pilot cooperates with two notches 97 and 98 in the end of the cam and stop device 93.

The valve operates in the following manner: With the valve in its left end position as shown in Figure 4, the pressure fluid is being supplied to the left end of the cylinder, so that the piston 7 moves toward the right, carrying with it the tool carriage 5 and guide rod 81. As the carriage approaches the right end of its movement spring 85 is brought up against the guide 79 of pilot 77. At first as the carriage continues to move toward the right the spring 85 is compressed without changing the position of the valve pilot. When a certain degree of compression is reached the friction between the pilot 77 and the notch 97 of the cam device 93 is overcome and the pilot snaps toward the right, slightly raising the cam device 93. This action is very rapid when once started and is completed when the pilot comes up against the end wall 99 (Fig. 7) of the cam device. The energy stored in spring 85 makes the movement quick and complete, and likewise the camming action of the notch 98 ensures a rapid movement of the valve pilot to its opposite end position. The dimensions of the notches 97 and 98 are such that when the pilot is in notch 97 the valve is in its left end position with port 57 exactly alined with duct 55, while when pilot 77 is in notch 98 the port 58 is exactly alined with duct 56.

The valve having moved to its right end position as just described, the pressure fluid is admitted to the right end of the cylinder while the left end of the cylinder is exhausted to the atmosphere; thus the piston begins to move toward the left. As the carriage approaches the left end of its movement the valve is snapped back to its left end position by the spring 83.

Upon the bottom of the carriage 5 a tool bed 100 is fixed by screws 102. The tool, which in this case is a thin metal worker's file 104, is screwed to the bed 100 by screws 106. At the middle of the file there is a screw 108 which serves to adjust the curvature of the file, this screw being threaded into the bed 100 and bearing at its head against the back of the file. The tool bed can be adjusted laterally by loosening screws 102 and shifting the tool bed, as permitted by slots 110 (Fig. 2) in the carriage.

Means are provided for stabilizing the tool and absorbing the vibrations. In the form of the invention shown in the drawings, a pair of runners 112 are mounted upon the motor at each side of the tool. The runners have upright sockets 114 which receive the downwardly bent ends 116 of supporting arms 118 pressed into holes 119 in the cylinder heads. The sockets 114 are held upon the supporting arms 118 by springs 120, the ends of which project into holes in the sockets and in the supporting arms. The ends of the arms 116 are held at a distance from the bottom of sockets 114 by the springs, so as to be able to move downward in the sockets under the restraint of springs 120. The runners as described provide a well balanced support for the reciprocating tool, stabilizing it against both rolling and pitching motions. It is furthermore advantageous to have the tool come to bear against the work by overcoming the yielding pressure of the stabilizers, as this enables the operator to gauge the force with which the tool is applied to the work much better than if it must be controlled entirely by his own arm muscles. The stabilizers can be removed from the motor if desired.

The machine tool as described is easy to operate and not tiresome to the operator, because of the stabilizers which absorb much of the vibration and eliminate a large part of the effort of holding the tool to the work, and also because the tool and motor are well balanced and the force which holds the tool to the work is naturally applied above the center of the tool. The valve action is direct and positive and prevents stalling of the motor by stoppage in an intermediate position. The motor and tool carriage are of simple design and therefore practical to manufacture. Repair of the motor is easy, because of the easy removability of the valve and the valve and cylinder liners.

The invention can be embodied in many different forms, the one shown and described being merely illustrative.

I claim:—

1. In a reciprocating machine tool, a cylinder provided with heads at its two ends and having bearings on its bottom surface, a tool carriage of greater length than said cylinder mounted under said cylinder so as to slide on said bearings, said carriage having means for attaching an abrading tool to the bottom thereof, upright members at the ends of said carriage, a piston in said cylinder, a piston rod extending therefrom through a stuffing box in one of said cylinder heads and connected with one of said upright members, and guide means projecting from the other cylinder head through the other one of said upright members.

2. In a reciprocating machine tool, a cylinder provided with heads at its two ends and having bearings on its lateral surface, a tool carriage of greater length than said cylinder slidable on said bearings, upright members at the ends of said carriage, a piston in said cylinder, a piston rod extending therefrom through a stuffing box in one of said cylinder heads and connected with one of said upright members, guide means projecting from the other cylinder head through the other one of said upright members, handles on the opposite ends of said cylinder diametrically opposite said tool carriage, said carriage having means for mounting an elongated abrading tool thereon with its longitudinal axis in a common plane with said handles and the axis of said cylinder.

3. In a reciprocating machine tool, a cylinder provided with heads at its two ends and having bearings on its lateral surface, a tool carriage of greater length than said cylinder slidable on said bearings, upright members at the ends of said carriage, a piston in said cylinder, a piston rod extending therefrom through a stuffing box in one of said cylinder heads and connected with one of said upright members, guide means projecting from the other cylinder head through the other one of said upright members, and a pair of stabilizers mounted on said cylinder so as to lie along opposite sides of said tool carriage.

4. In a reciprocating machine tool, a cylinder provided with heads at its two ends and having bearings on its lateral surface, a tool carriage of greater length than said cylinder slidable on said bearings, upright members at the ends of said carriage, a piston in said cylinder, a piston rod extending therefrom through a stuffing box in one of said cylinder heads and connected with one of said upright members, guide means projecting from the other cylinder head through the other one of said upright members, a valve rod and bearings whereby said valve rod is slidably mounted on a lateral wall of said cylinder, said bearings, valve rod, and cylinder wall having cooperating parts for alternately admitting a fluid pressure medium to and exhausting it from opposite ends of said cylinder, a valve pilot on said valve rod, a spring detent engaging said valve pilot, said detent and pilot having cooperating bevel faces arranged to hold said valve in either of two end positions, and a pair of springs mounted on said carriage and engageable with said valve pilot from opposite directions near the ends of the movement of said carriage to shift said valve rod.

5. In a reciprocating machine tool, a cylinder provided with heads at its two ends and having bearings on its lateral surface, a tool carriage of greater length than said cylinder slidable on said bearings, upright members at the ends of said carriage, a piston in said cylinder, a piston rod extending therefrom through a stuffing box in one of said cylinder heads and connected with one of said upright members, guide means projecting from the other cylinder head through the other one of said upright members, a valve rod and bearings whereby said valve rod is slidably mounted on a lateral wall of said cylinder, said bearings, valve rod, and cylinder wall having cooperating parts for alternately admitting a fluid pressure medium to and exhausting it from opposite ends of said cylinder, a valve pilot extending laterally from said valve rod, a guide rod on said carriage passing through a hole in said valve pilot, and springs on said guide rod on opposite sides of said valve pilot, for engaging said valve pilot near the ends of the movement of said carriage to shift said valve rod.

6. In a reciprocating machine tool, a cylinder provided with heads at its two ends and having open ball bearing sockets on its bottom surface, ball bearings in said sockets, a tool carriage of greater length than said cylinder mounted under said cylinder so as to slide on said bearings, upright members at the ends of said carriage, a piston in said cylinder, a piston rod extending therefrom through a stuffing box in one of said cylinder heads and connected with one of said upright members, and guide means projecting from the other cylinder head through the other one of said upright members.

7. In a reciprocating machine tool, a pneumatic motor comprising a small cylinder capable of being carried by hand and a piston therein, bearings on the bottom of said cylinder, a tool carriage slidable on said bearings, said carriage having means for attaching an abrading tool to the bottom thereof, and means at the opposite ends of said carriage for holding the same against said bearings, said last means comprising a connection between said carriage and said piston.

8. In a device of the class described, an elongated bedplate having means for attaching an abrading tool to the bottom thereof, a cylinder of shorter length than said bedplate provided with bearings on its cylindrical surface against which said bedplate rests, uprights at the ends of said bedplate between which said cylinder lies, a piston in said cylinder, and means at the opposite ends of said cylinder for guiding said bedplate through said uprights so as to reciprocate with respect to said cylinder, said last means including a connecting rod between said piston and one of said uprights.

9. In a machine of the class described, a pneumatic motor comprising a cylinder and a piston therein, handles fixed to said cylinder at each end, the bases of said handles being bored to form alined valve seats, a slide valve mounted in said seats, said cylinder and valve having cooperating ports for the transmission of a fluid pressure medium to and from the opposite ends of said cylinder, a tool carriage mounted to reciprocate on said cylinder, means connecting said tool carriage with said piston, and means whereby said valve is controlled by said tool carriage.

10. In a machine of the class described, a pneumatic motor comprising a cylinder and a piston therein, a handle on said cylinder having a canal therein alined with a port in said cylinder, said handle having a bore therein intersecting said canal, a valve in said bore having a hole therein adapted to interconnect said canal and said port in one position of said valve, a tool carriage mounted on said cylinder and connected with said piston, and means controlled by said carriage for moving said valve.

11. In a machine of the class described, a pneumatic motor comprising a cylinder and a piston therein, a carriage slidably mounted on said cylinder and connected with said piston, valve rod bearings on said cylinder, a valve rod slidably mounted therein, a valve pilot projecting rigidly from said valve rod and having a bearing near its end, a guide rod slidable in said bearing, a detent urged against said pilot by a spring and having notches to receive and hold said pilot in different positions, and means movable with said carriage and engageable with said pilot to shift said pilot and valve.

EURAL WADE TAYLOR.